(12) United States Patent
Ye

(10) Patent No.: US 10,278,212 B2
(45) Date of Patent: Apr. 30, 2019

(54) DEVICE AND METHOD OF HANDLING RANDOM ACCESS PROCEDURE

(71) Applicant: HTC Corporation, Taoyuan (TW)

(72) Inventor: Shiang-Rung Ye, Taoyuan (TW)

(73) Assignee: HTC Corporation, Taoyuan (TW)

( * ) Notice: Subject to any disclaimer, the term of this patent is extended or adjusted under 35 U.S.C. 154(b) by 89 days.

(21) Appl. No.: 15/473,635

(22) Filed: Mar. 30, 2017

(65) Prior Publication Data

US 2017/0290063 A1 Oct. 5, 2017

Related U.S. Application Data

(60) Provisional application No. 62/316,597, filed on Apr. 1, 2016.

(51) Int. Cl.
H04W 74/08 (2009.01)
H04B 17/318 (2015.01)

(52) U.S. Cl.
CPC ....... *H04W 74/0833* (2013.01); *H04B 17/318* (2015.01)

(58) Field of Classification Search
CPC .................. H04W 74/0833; H04B 17/318
See application file for complete search history.

(56) References Cited

U.S. PATENT DOCUMENTS

| 2006/0062196 A1* | 3/2006 | Cai | H04L 5/0037 370/345 |
| 2011/0110240 A1* | 5/2011 | Bergquist | H04W 74/0866 370/241.1 |
| 2012/0002617 A1* | 1/2012 | Vujcic | H04W 74/002 370/329 |
| 2015/0016312 A1* | 1/2015 | Li | H04W 74/0833 370/280 |

(Continued)

FOREIGN PATENT DOCUMENTS

| WO | 2015116732 A1 | 8/2015 |
| WO | 2016025899 A1 | 2/2016 |

OTHER PUBLICATIONS

Search Report dated Aug. 25, 2017 for EP application No. 17163850.5, pp. 1-10.

(Continued)

Primary Examiner — Zhiren Qin
(74) Attorney, Agent, or Firm — Winston Hsu

(57) ABSTRACT

A communication device of handling a random access procedure comprises a storage unit for storing instructions and a processing circuit coupled to the storage unit. The processing circuit is configured to execute the instructions stored in the storage unit. The instructions comprise determining a first coverage enhancement (CE) level; selecting at least one first random access preamble from a first preamble group corresponding to the first CE level; performing the random access procedure according to the at least one first (Continued)

random access preamble with a network; determining a second CE level, if the random access procedure performed according to the first access preamble is performed unsuccessfully; selecting at least one second random access preamble from a second preamble group; and performing the random access procedure according to the at least one second random access preamble with the network.

17 Claims, 5 Drawing Sheets

(56) References Cited

U.S. PATENT DOCUMENTS

| | | | |
|---|---|---|---|
| 2015/0289179 A1* | 10/2015 | Liu | H04W 48/20 |
| | | | 370/331 |
| 2016/0295609 A1* | 10/2016 | Vajapeyam | H04L 5/14 |
| 2016/0373943 A1* | 12/2016 | Wang | H04W 24/02 |
| 2017/0099682 A1* | 4/2017 | Priyanto | H04W 74/0833 |
| 2017/0105127 A1* | 4/2017 | Xiong | H04W 76/14 |
| 2017/0347335 A1* | 11/2017 | Yi | H04W 68/02 |
| 2018/0097599 A1* | 4/2018 | Lee | H04W 24/02 |
| 2018/0176847 A1* | 6/2018 | Fasil Abdul | H04J 11/0093 |

OTHER PUBLICATIONS

LG Electronics Inc., "Change of coverage enhancement level for RRC Connected UE", 3GPP TSG-RAN2 Meeting #92, R2-156758, Nov. 16-20, 2015, Anaheim, U.S.A., XP051024920, pp. 1-2.
3GPP TSG-WG2 Meeting #93 R2-162040, Feb. 2016.
3GPP TS 36.321 V13.1.0, Mar. 2016.

* cited by examiner

DEVICE AND METHOD OF HANDLING RANDOM ACCESS PROCEDURE

CROSS REFERENCE TO RELATED APPLICATIONS

This application claims the benefit of U.S. Provisional Application No. 62/316,597, filed on Apr. 1, 2016, which is incorporated herein by reference.

BACKGROUND OF THE INVENTION

1. Field of the Invention

The present invention relates to a device and a method used in a wireless communication system, and more particularly, to a communication device and method of handling a random access procedure.

2. Description of the Prior Art

When performing a random access procedure, a user equipment (UE) selects a coverage enhancement (CE) level for performing the random access procedure. However, the UE may not be able to perform the random access procedure successfully, e.g., because the selected CE level is not appropriate for an environment where the UE locates. In this situation, it is inefficient for the UE to perform the random access procedure by using the same CE level.

Thus, how to handle the random access procedure is an important problem to be solved.

SUMMARY OF THE INVENTION

The present invention therefore provides a method and related communication device for handling a random access procedure to solve the abovementioned problem.

A communication device of handling a random access procedure comprises a storage unit for storing instructions and a processing circuit coupled to the storage unit. The processing circuit is configured to execute the instructions stored in the storage unit. The instructions comprise determining a first coverage enhancement (CE) level; selecting at least one first random access preamble from a first preamble group corresponding to the first CE level; performing the random access procedure according to the at least one first random access preamble with a network; determining a second CE level, if the random access procedure performed according to the first access preamble is performed unsuccessfully; selecting at least one second random access preamble from a second preamble group; and performing the random access procedure according to the at least one second random access preamble with the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
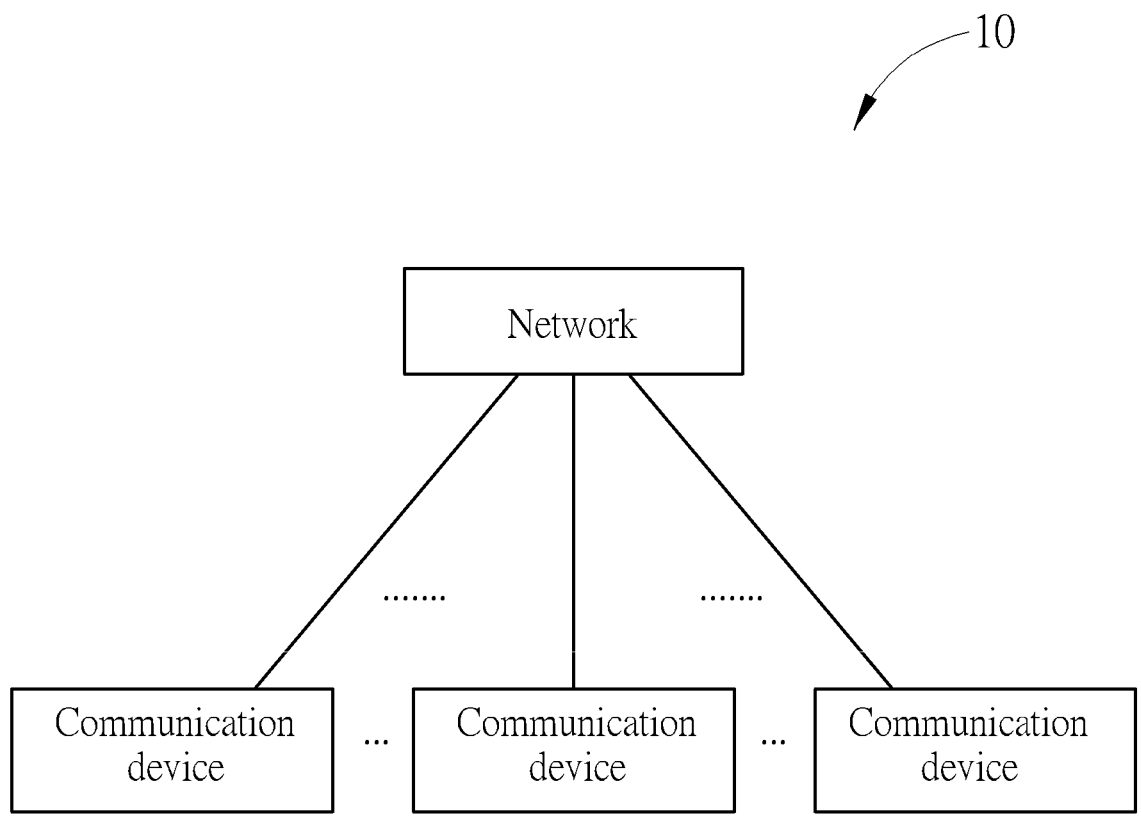
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) including at least one Node-Bs (NB) in a universal mobile telecommunications system (UMTS). Alternatively, the network may be an evolved UTRAN (E-UTRAN) including at least one evolved NB (eNB) and/or at least one relay in a long term evolution (LTE) system, a LTE-Advanced (LTE-A) system, an evolution of the LTE-A system, or a fifth generation (5G) system. Further, the network may also include both the UTRAN/E-UTRAN and a core network, wherein the core network includes network entities such as a mobility management entity (MME), a serving gateway (S-GW), a packet data network (PDN) gateway (P-GW), a self-organizing networks (SON) server and/or a radio network controller (RNC), etc.

The communication device may be a user equipment (UE), a mobile phone, a laptop, a tablet computer, an electronic book, a portable computer system, a vehicle or an aircraft. In addition, the network and the communication device can be seen as a transmitter or a receiver according to transmission direction, e.g., for a uplink (UL), the communication device is the transmitter and the network is the receiver, and for a downlink (DL), the network is the transmitter and the communication device is the receiver.

Figure 2:
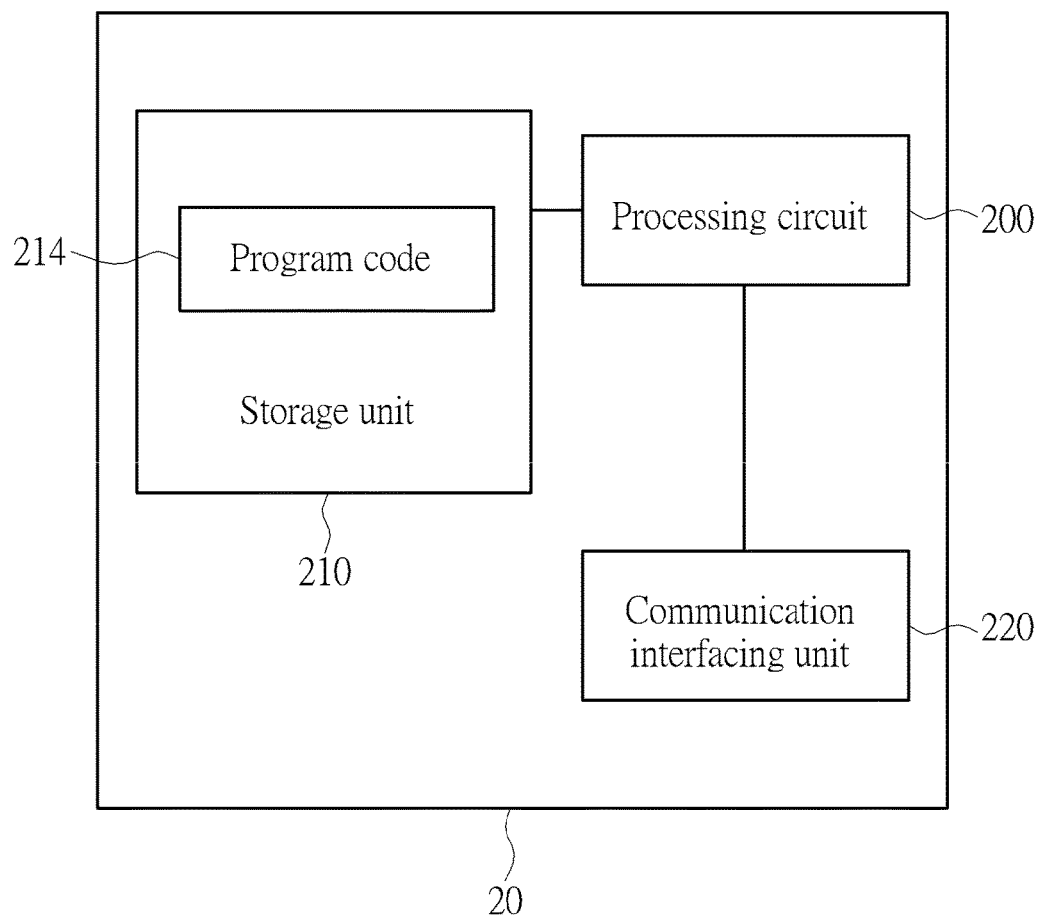
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that stores a program code 214, accessed and executed by the processing circuit 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing circuit 200.

In the following diagrams and embodiments, a UE is used to represent the communication device in FIG. 1, to simplify the illustration of the embodiments.

Figure 3:
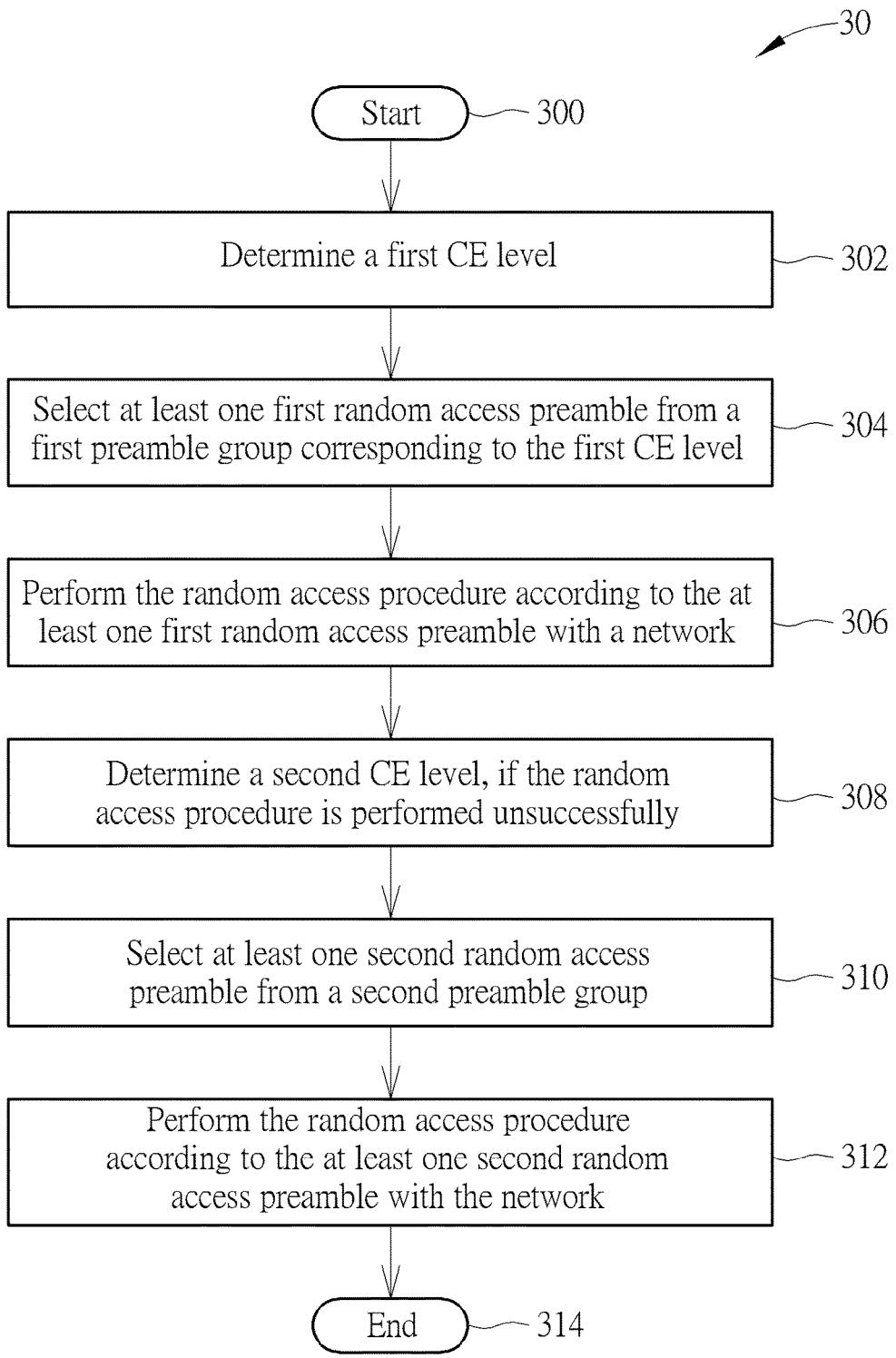
FIG. 3 is a flowchart of a process according to an example of the present invention.

FIG. 3 is a flowchart of a process 30 according to an example of the present invention. The process 30 may be utilized in a UE (e.g., the communication device in FIG. 1), to handle a random access procedure in a wireless communication system. The process 30 includes the following steps:

Step 300: Start.
Step 302: Determine a first coverage enhancement (CE) level.
Step 304: Select at least one first random access preamble from a first preamble group corresponding to the first CE level.
Step 306: Perform the random access procedure according to the at least one first random access preamble with a network.
Step 308: Determine a second CE level, if the random access procedure is performed unsuccessfully.
Step 310: Select at least one second random access preamble from a second preamble group.
Step 312: Perform the random access procedure according to the at least one second random access preamble with the network.
Step 314: End.

According to the process 30, the UE may determine a first CE level (e.g., an initial CE level), and may select at least one first random access preamble from a first preamble group corresponding (e.g., configured) to the first CE level. The UE may perform the random access procedure according to (e.g., by using) the at least one first random access preamble with a network (e.g., the network in FIG. 1). Then, the UE may determine a second CE level, if the random access procedure is performed unsuccessfully. The UE may select at least one second random access preamble from a second preamble group. The UE may perform the random access procedure according to (e.g., by using) the at least one second random access preamble with the network. That is, the UE determines another CE level for performing the random access procedure, when the random access procedure is not performed successfully. Thus, the UE is able to complete the random access procedure. As a result, communications between the UE and the network can be proceeded regularly.

For Step 308, the UE may not determine the second CE level, if the random access procedure is performed unsuccessfully and a message (e.g., "Msg3" defined in the 3GPP standard, which may contain a radio resource control (RRC) request message, a RRC re-establishment message or a cell radio network temporary identifier (C-RNTI) medium access control (MAC) control element) is transmitted by the UE. Then, the UE may select at least one third random access preamble from a third preamble group corresponding (e.g., configured) to the first CE level. The UE may perform the random access procedure according to (e.g., by using) the at least one third random access preamble with the network. In one example, the at least one first random access preamble and the at least one third random access preamble may be the same or different.

Realization of the process 30 is not limited to the above description. The following examples may be applied for realizing the process 30.

In one example, the first CE level may be determined according to (e.g., by using) a DL measurement result. In one example, the DL measurement result may include information of reference signal received power (RSRP). That is, the first CE level may be determined by using the RSRP. In one example, the RSRP may be (e.g., fall) in a range, and all RSRPs in the range may be mapped to the first CE level according to a one-to-one mapping scheme.

In one example, the UE may determine that the random access procedure is performed unsuccessfully, if the at least one first random access preamble is retransmitted for a first maximum number of retransmission attempts. In one example, the first maximum number of the retransmission attempts may be determined according to (e.g., by using) the first CE level.

It should be noted that the UE may use multiple random access preambles for performing the random access procedure before determining that the random access procedure is performed unsuccessfully. For example, for a first attempt, the UE may perform the random access procedure by using a first random access preamble with a number of repetitions. If the first attempt is failed, for a second attempt, the UE may perform the random access procedure by using a second random access preamble with the number of repetitions. The UE may continue the above process until the number of attempts where multiple random access preambles are used achieves the maximum number of retransmission attempts. Accordingly, the UE determines that the random access procedure is performed unsuccessfully. In one example, the number of repetitions and the maximum number of retransmission attempts may be determined according to (e.g., by using) a CE level determined by the UE.

In one example, the step that the UE performs the random access procedure according to the at least one first random access preamble with the network (Step 306) may include: the UE may perform the random access procedure according to the at least one first random access preamble with a first number of repetitions with the network. Then, the UE may increase a counter (e.g., increase a value in the counter by 1), if a random access response message (e.g., "Msg2" defined in the 3GPP standard) is not received from the network. The UE may determine a number of retransmission attempts according to the counter. The UE may determine that the random access procedure is performed unsuccessfully, if the number of retransmission attempts is larger than (or equal to) a first maximum number of retransmission attempts.

In one example, the first number of the repetitions may be determined according to (e.g., by using) the first CE level. In one example, the UE may perform the random access procedure according to the at least one second random access preamble with a second number of repetitions with the network. In one example, the second number of the repetitions may be determined according to (e.g., by using) the second CE level. In one example, the first maximum number of the retransmission attempts may be determined according to the first CE level.

In one example, the second preamble group may be corresponding to the second CE level, if a message (e.g., "Msg3" defined in the 3GPP standard, which may contain a RRC request message, a RRC re-establishment message or a C-RNTI MAC control element) is not transmitted by the UE. That is, the UE selects at least one preamble from a preamble group corresponding to a CE level presently determined by the UE.

In one example, the second preamble group may be corresponding to the first CE level, if a message (e.g., "Msg3" defined in the 3GPP standard, which may contain a RRC request message, a RRC re-establishment message or a C-RNTI MAC control element) is transmitted by the UE. That is, the UE selects at least one preamble from a preamble group corresponding to a CE level previously (e.g., initially) determined by the UE. In one example, the at least one first random access preamble and the at least one second random access preamble may be the same or different.

In one example, the second preamble group may include at least one subgroup. In one example, a first one of the at least one subgroup may be corresponding (e.g., configured) to the first CE level. That is, the first one of the at least one subgroup is corresponding to a CE level previously (e.g., initially) determined by the UE. In one example, a second one of the at least one subgroup may be corresponding to (e.g., configured) the second CE level. That is, the second one of the at least one subgroup is corresponding to a CE level presently (e.g., initially) determined by the UE.

In one example, a configuration configuring the at least one subgroup may be broadcasted by the network. In one example, the configuration configuring the subgroup may be transmitted in a RRC (e.g., dedicated) message by the network.

Figure 4:
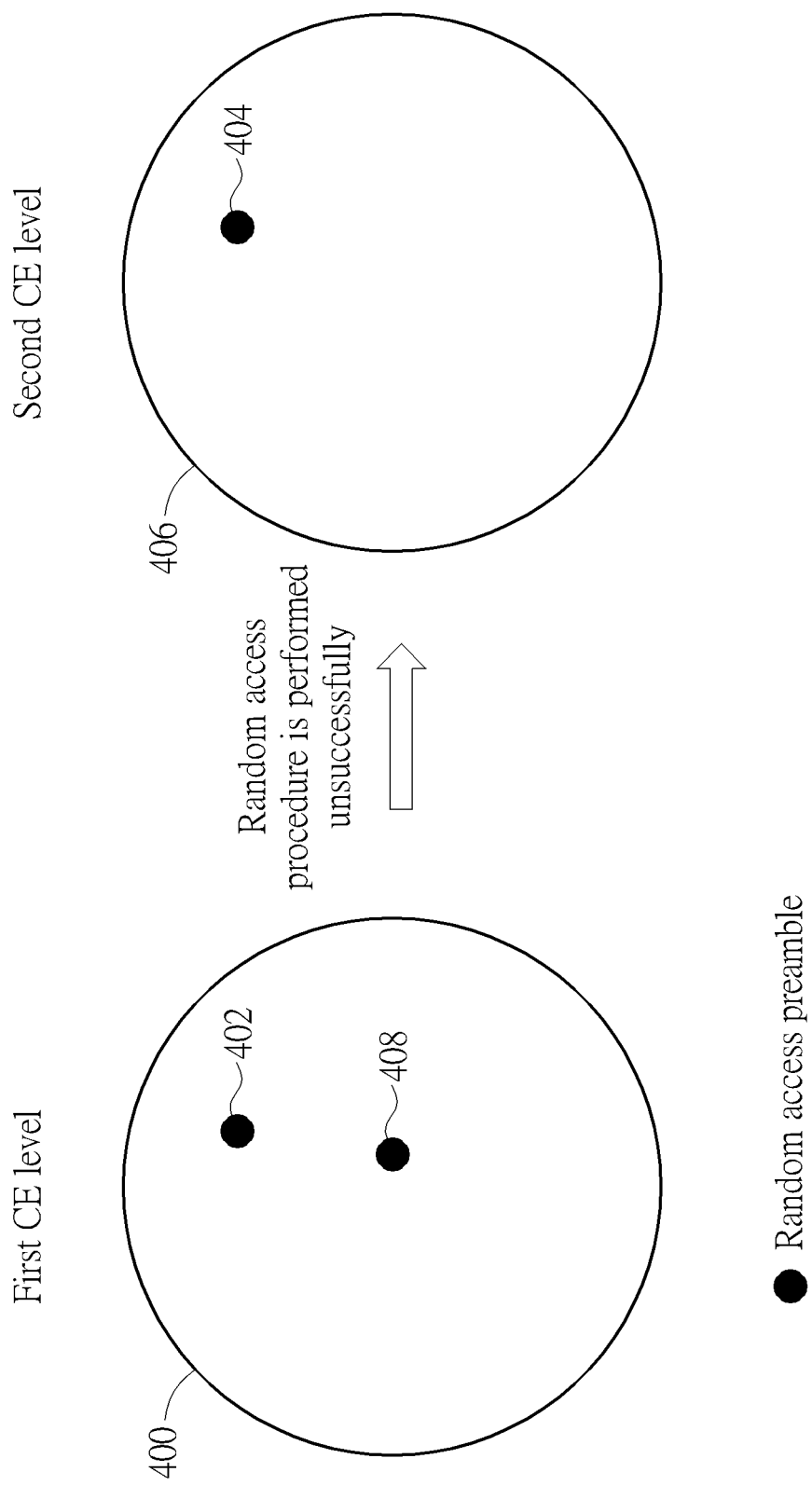
FIG. 4 is a schematic diagram of determinations of CE levels according to an example of the present invention.

FIG. 4 is a schematic diagram of determinations of CE levels according to an example of the present invention. The UE determines (e.g., initially) a first CE level corresponding to a first preamble group 400, and selects at least one first random access preamble 402 from the first preamble group 400. The UE performs a random access procedure by using the at least one first random access preamble 402 with a first number of repetitions determined according to the first CE level (e.g., 1, 2, 4, . . . , or 128 repetition(s)) with the network. Then, the UE determines a second CE level, if the random access procedure is performed unsuccessfully (e.g., the at least one first random access preamble 402 is retransmitted for a maximum number of retransmission attempts). In one example, the UE selects at least one second random access preamble 404 from a second preamble group 406 corresponding to the second CE level, if "Msg3" is not transmitted by the UE. The UE performs the random access procedure by using the at least one second random access preamble 404 with a second number of repetitions determined according to the second CE level (e.g., 1, 2, 4, . . . , or 128 repetition(s)) with the network. In another example, the UE selects at least one third random access preamble 408 from the first preamble group 400 corresponding to the first CE level, if "Msg3" is transmitted by the UE. The UE performs the random access procedure by using the at least one third random access preamble 408 with the first number of repetitions determined according to the first CE level (e.g., 1, 2, 4, . . . , or 128 repetition(s)) with the network.

Figure 5:
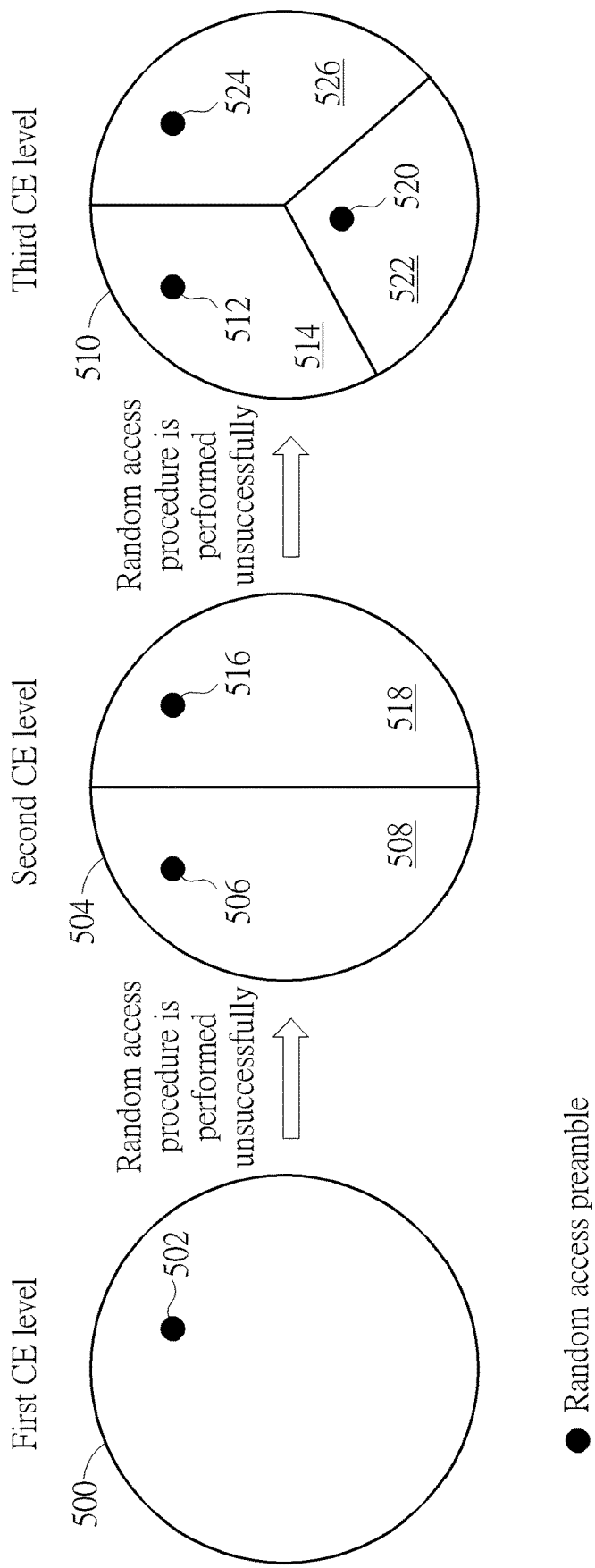
FIG. 5 is a schematic diagram of determinations of CE levels according to an example of the present invention.

FIG. 5 is a schematic diagram of determinations of CE levels according to an example of the present invention. In one example, the UE determines (e.g., initially) a first CE level corresponding to a first preamble group 500, and selects at least one first random access preamble 502 from the first preamble group 500. The UE performs a random access procedure by using the at least one first random access preamble 502 with a first number of repetitions determined according to the first CE level (e.g., 1, 2, 4, . . . , or 128 repetition(s)) with the network. Then, the UE determines a second CE level, if the random access procedure is performed unsuccessfully (e.g., the at least one first random access preamble 502 is retransmitted for a first maximum number of retransmission attempts). The UE selects at least one second random access preamble 506 from a first subgroup 508 of a second preamble group 504 corresponding to the second CE level, if "Msg3" is not transmitted by the UE. The first subgroup 508 may be configured (e.g., mapped) for a CE level previously (e.g., initially) determined by the UE, e.g., the first CE level. The UE performs the random access procedure by using the at least one second random access preamble 506. Further, the UE determines a third CE level, if the random access procedure is performed unsuccessfully (e.g., the at least one second random access preamble 506 is retransmitted for a second maximum number of retransmission attempts). The UE selects at least one third random access preamble 512 from a first subgroup 514 of the third preamble group 510 corresponding to the third CE level, if "Msg3" is not transmitted by the UE. The first subgroup 514 may be configured (e.g., mapped) for a CE level previously (e.g., initially) determined by the UE, e.g., the first CE level. The UE performs the random access procedure by using the at least one third random access preamble 512.

In one example, the UE determines (e.g., initially) the second CE level corresponding to the second preamble group 504, and selects at least one fourth random access preamble 516 from a second subgroup 518 of the second preamble group 504. The second subgroup 518 is configured (e.g., mapped) for a CE level previously (e.g., initially) determined by the UE, e.g., the second CE level. The UE performs the random access procedure by using the at least one fourth random access preamble 516. If the network receives the at least one fourth random access preamble 516, the network knows the range of the DL measurement result measured by the UE. The network may transmit a response message with parameters (e.g. transmission power, a modulation and coding scheme, and/or the number of repetitions (e.g., transmission repetitions)) corresponding to the range of the DL measurement result. Further, the UE determines the third CE level, if the random access procedure is performed unsuccessfully (e.g., the at least one fourth random access preamble 516 is retransmitted for a third maximum number of retransmission attempts). The UE selects at least one fifth random access preamble 520 from a second subgroup 522 of the third preamble group 510 corresponding to the third CE level, if "Msg3" is not transmitted by the UE. The second subgroup 522 may be configured (e.g., mapped) for a CE level previously (e.g., initially) determined by the UE, e.g., the second CE level. The UE performs the random access procedure by using the at least one fifth random access preamble 520. In one example, the first subgroup 514 of the third preamble group 510 and the second subgroup 522 of the third preamble group 510 may be combined into a subgroup. Thus, the subgroup may be configured (e.g., mapped) for at least one CE level previously (e.g., initially) determined by the UE, e.g., the first CE level and/or the second CE level.

In one example, the UE determines (e.g., initially) the third CE level corresponding to the third preamble group 510, and selects at least one sixth random access preamble 524 from a third subgroup 526 of the third preamble group 510. The third subgroup 526 is configured (e.g., mapped) for a CE level previously (e.g., initially) determined by the UE, e.g., the third CE level. The UE performs the random access procedure by using the at least one sixth random access preamble 524.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20. Any of the abovementioned processes may be compiled into the program code 214.

To sum up, the present invention provides a method and related communication device for handling a random access procedure. Accordingly, the UE is able to determine another CE level, when the random access procedure is performed unsuccessfully. Thus, the UE is able to complete the random access procedure. As a result, communications between the UE and the network can be proceeded regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a random access procedure, comprising:
   a storage unit, for storing instructions of:
   determining a first coverage enhancement (CE) level;
   selecting at least one first random access preamble from a first preamble group corresponding to the first CE level;
   performing the random access procedure according to the at least one first random access preamble with a network;
   determining a second CE level for performing the random access procedure, if the random access procedure is performed unsuccessfully;
   selecting at least one second random access preamble from a second preamble group; and
   performing the random access procedure according to the at least one second random access preamble with the network;
   wherein the second preamble group comprises at least one subgroup, and a first one of the at least one subgroup is corresponding to the first CE level, and a second one of the at least one subgroup is corresponding to the second CE level; and
   a processing circuit, coupled to the storage unit, configured to execute the instructions stored in the storage unit.

2. The communication device of claim 1, wherein the first CE level is determined according to a downlink (DL) measurement result.

3. The communication device of claim 2, wherein the DL measurement result comprises information of reference signal received power (RSRP).

4. The communication device of claim 1, wherein the communication device determines that the random access procedure is performed unsuccessfully, if the at least one first random access preamble is retransmitted for a first maximum number of retransmission attempts.

5. The communication device of claim 4, wherein the first maximum number of the retransmission attempts is determined according to the first CE level.

6. The communication device of claim 1, wherein the instruction of performing the random access procedure according to the at least one first random access preamble with the network comprises:

performing the random access procedure according to the at least one first random access preamble with a first number of repetitions with the network;
increasing a counter, if a random access response message is not received from the network; and
determining a number of retransmission attempts according to the counter.

7. The communication device of claim 6, wherein the communication device determines that the random access procedure is performed unsuccessfully, if the number of retransmission attempts is larger than a first maximum number of retransmission attempts.

8. The communication device of claim 7, wherein the first maximum number of the retransmission attempts is determined according to the first CE level.

9. The communication device of claim 6, wherein the first number of the repetitions is determined according to the first CE level.

10. The communication device of claim 1, wherein the second preamble group is corresponding to the second CE level, if a radio resource control (RRC) request message has not been transmitted by the communication device.

11. The communication device of claim 1, wherein the second preamble group is corresponding to the second CE level, if a radio resource control (RRC) re-establishment message has not been transmitted by the communication device.

12. The communication device of claim 1, wherein the second preamble group is corresponding to the second CE level, if a cell radio network temporary identifier (C-RNTI) medium access control (MAC) control element has not been transmitted by the communication device.

13. The communication device of claim 1, wherein the second preamble group is corresponding to the first CE level, if a RRC request message is transmitted by the communication device.

14. The communication device of claim 13, wherein the at least one first random access preamble and the at least one second random access preamble is the same or different.

15. The communication device of claim 1, wherein the second preamble group is corresponding to the first CE level, if a RRC re-establishment message is transmitted by the communication device.

16. The communication device of claim 1, wherein the second preamble group is corresponding to the first CE level, if a cell radio network temporary identifier (C-RNTI) medium access control (MAC) control element is transmitted by the communication device.

17. The communication device of claim 1, wherein a configuration configuring the at least one subgroup is broadcasted by the network, or is transmitted in a radio resource control (RRC) message by the network.

* * * * *